United States Patent
Hasebe et al.

(10) Patent No.: US 7,334,815 B2
(45) Date of Patent: Feb. 26, 2008

(54) AIRBAG, METHOD OF MANUFACTURING THE SAME, AIRBAG APPARATUS AND VEHICLE

(75) Inventors: Masahiro Hasebe, Minato-ku (JP); Yukitoshi Narimoto, Minato-ku (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 11/356,657

(22) Filed: Feb. 17, 2006

(65) Prior Publication Data
US 2006/0282203 A1 Dec. 14, 2006

(30) Foreign Application Priority Data
Jun. 14, 2005 (JP) .............................. 2005-173908

(51) Int. Cl.
*B60R 21/16* (2006.01)
(52) U.S. Cl. .................................................. 280/743.1
(58) Field of Classification Search ................ 280/729, 280/743.1, 743.2
See application file for complete search history.

(56) References Cited

U.S. PATENT DOCUMENTS

| | | | | |
|---|---|---|---|---|
| 5,582,429 | A * | 12/1996 | Heinz et al. ............. | 280/743.2 |
| 6,095,557 | A * | 8/2000 | Takimoto et al. ........... | 280/739 |
| 6,113,141 | A * | 9/2000 | Baker ....................... | 280/743.2 |
| 6,457,745 | B1 * | 10/2002 | Heigl ....................... | 280/743.2 |
| 6,489,006 | B1 * | 12/2002 | Keshavaraj ................. | 428/125 |
| 6,540,254 | B2 * | 4/2003 | Bieber et al. ............... | 280/732 |
| 6,550,809 | B1 * | 4/2003 | Masuda et al. .......... | 280/743.1 |
| 6,655,714 | B2 * | 12/2003 | Fellhauer et al. ........ | 280/743.1 |
| 6,802,534 | B2 * | 10/2004 | Neupert .................... | 280/743.1 |
| 6,832,778 | B2 * | 12/2004 | Pinsenschaum et al. .... | 280/739 |
| 7,000,948 | B2 * | 2/2006 | Little et al. .............. | 280/743.1 |
| 7,070,203 | B2 * | 7/2006 | Fisher et al. ................ | 280/735 |
| 7,093,854 | B2 * | 8/2006 | Fischer et al. ........... | 280/743.2 |
| 7,134,691 | B2 * | 11/2006 | Dunkle et al. ........... | 280/743.2 |
| 7,192,053 | B2 * | 3/2007 | Thomas ...................... | 280/739 |
| 2003/0184069 | A1 * | 10/2003 | Takimoto et al. ........ | 280/743.1 |
| 2003/0218325 | A1 * | 11/2003 | Hasebe et al. ........... | 280/743.2 |

(Continued)

FOREIGN PATENT DOCUMENTS

JP 49-23176 6/1974

(Continued)

*Primary Examiner*—Faye M. Fleming
(74) *Attorney, Agent, or Firm*—Fitch, Even, Tabin & Flannery

(57) ABSTRACT

An airbag is provided in which connecting belts extending from opposed surfaces of a left airbag section and a right airbag section can be connected easily to each other and which can be manufactured easily. In one form, the airbag is composed of four panels; an inside panel, a right outside panel, a left outside panel and a proximal panel. Connecting belts are connected to the inside panel. The respective connecting belts are each formed with an insertion portion by folding a cloth fabric having a pair of end sides at about a midsection thereof. Rod-shaped jigs are inserted into the respective insertion portions. In a state in which the connecting belts are overlapped, the jibs are fixed in parallel at a predetermined distance, and width control tethers are pulled in the directions away from each other. Accordingly, a tensile force is applied to the respective connecting belts, and hence a tensed flatly extended state is achieved. Therefore, the connecting belts can be stitched with respect to each other easily.

9 Claims, 7 Drawing Sheets

U.S. PATENT DOCUMENTS

| | | | |
|---|---|---|---|
| 2004/0145160 A1* | 7/2004 | Hasebe et al. | 280/729 |
| 2004/0145161 A1* | 7/2004 | Hasebe et al. | 280/729 |
| 2004/0195807 A1 | 10/2004 | Hasebe et al. | |
| 2006/0071458 A1* | 4/2006 | Sendelbach et al. | 280/729 |

FOREIGN PATENT DOCUMENTS

| | | |
|---|---|---|
| JP | 4292239 | 10/1992 |
| JP | 10-71911 | 3/2006 |

* cited by examiner

AIRBAG, METHOD OF MANUFACTURING THE SAME, AIRBAG APPARATUS AND VEHICLE

FIELD OF THE INVENTION

The present invention relates to an airbag that is inflated upon collision of a vehicle for receiving a passenger and an airbag apparatus and, more specifically, to an airbag having a left airbag section and a right airbag section that are inflated respectively on the left and right sides in front of the passenger and an airbag apparatus. The present invention relates to a method of manufacturing the airbag and a vehicle provided with the airbag apparatus.

BACKGROUND OF THE INVENTION

An airbag for receiving the passenger upon collision of the vehicle, an airbag having a left airbag section and a right airbag section that are inflated respectively on the left and right sides in front of the passenger, and the airbag sections are inflated by a common inflator is disclosed in Japanese Unexamined Patent Application Publication No. 2004-314933.

In FIG. 19 in the same patent document, a cross-section of an airbag in which opposed surfaces of the left airbag section and the right airbag section are connected by a connecting belt (in this patent document, it is referred to as "connecting belt") is shown.

The connecting belt of the same patent document includes a left belt half stitched at a proximal side thereof to the left airbag section and a right belt half stitched at a proximal side thereof to the right airbag section. By overlapping the belt halves with each other and stitching distal ends of the belt halves to each other, the belt haves are connected to each other.

The connecting belt connects midsections in the fore-and-aft direction of the respective left and right airbag sections to each other. By the provision of the connecting belt, the left and right respective bags pull each other in the course of inflation of the airbag, whereby the left and right sides are inflated substantially uniformly (paragraph 138 in the same patent document).

SUMMARY OF THE INVENTION

Accordingly, an object of the present invention is to provide an airbag in which connecting belts extending from opposed surfaces of left and right airbag sections can be connected easily and hence can be manufactured easily, a method of manufacturing the airbag, an airbag apparatus and a vehicle provided with the airbag.

An airbag according to one form is an airbag in which a distal side is inflated in a direction moving apart from a proximal side by injected gas from an inflator disposed on the proximal side, including a left airbag section that is inflated on the left side in front of a passenger and a right airbag section that is inflated on the right side in front of the passenger, connecting belts extending from opposed surfaces of the left airbag section and the right airbag section, the left connecting belt continued from the left airbag section and the right connecting belt continued from the right airbag section being connected to each other, characterized in that insertion portions for inserting jigs for applying a tensile force to the connecting belts when connecting the connecting belts to each other are provided at distal sides of the respective connecting belts in the direction of extension.

In addition to above-described form, the airbag according to another form is characterized in that each connecting belt is formed into a two-fold overlapped member by folding a connecting belt panel having a pair of opposed sides at a midsection between the opposed sides thereof, the side of the opposed sides of the overlapped member is connected to the left airbag section and the right airbag section, and the portion between two sheets of the two-fold overlapped member along the folded portion is formed as the insertion portion.

In addition to either of the above-described forms, the airbag according to another form is characterized in that the left airbag section and the right airbag section are provided respectively with tethers that connect the opposed surfaces and surfaces opposite therefrom in the respective airbags for controlling the widths when the bags are inflated.

A method of manufacturing the airbag in another form is the method of manufacturing the airbag according to any one of the above-referenced forms, including inserting jigs into the insertion portions of the respective connecting belts, applying a tensile force to the connecting belts by the jigs, and in this state, connecting the overlapped connecting belts with respect to each other when connecting the left connecting belt and the right connecting belt.

In addition to the above-described form, the method of manufacturing the airbag according to another form is characterized in that the jig is a rod-shaped member.

An airbag apparatus according to another form includes the airbag according to any one of the above-described forms, and the inflator for inflating the airbag.

A vehicle according to another form includes the airbag apparatus according to above-described form.

In the airbag according to the present invention, the insertion portions are respectively provided on the left connecting belt attached to the left airbag section and the right connecting belt attached to the right airbag section. The respective connecting belts are applied with the tensile force by inserting the jigs into the insertion portions, so that the connecting belts can be brought into a tensed state. Accordingly, the connecting belts can be connected (for example, stitched) easily with respect to each other.

The connecting belt is preferably formed into the two-fold overlapped member by folding one connecting belt panel having a pair of opposed sides at a midsection thereof. When the opposed sides of the overlapped members are connected to the left airbag section or the right airbag section, the portion between the two sheets is formed into the insertion portion.

In the present invention, in a case in which the tethers connecting the opposed surfaces and the surfaces opposite therefrom in the respective bags are provided in the left airbag section and the right airbag section for controlling the widths when the bags are inflated, a force in the directions away from the jigs can be applied to the connecting belts via the tethers by pulling the opposed surfaces and the opposite surfaces of the respective bags. Accordingly, the tensile force can be applied to the connecting belts easily.

As the jig, a rod-shaped member is preferable since it can be inserted into the insertion portion easily and the sufficient tensile force can be applied to the connecting belts.

DETAILED DESCRIPTION OF THE PREFERRED EMBODIMENTS

Figure 1:
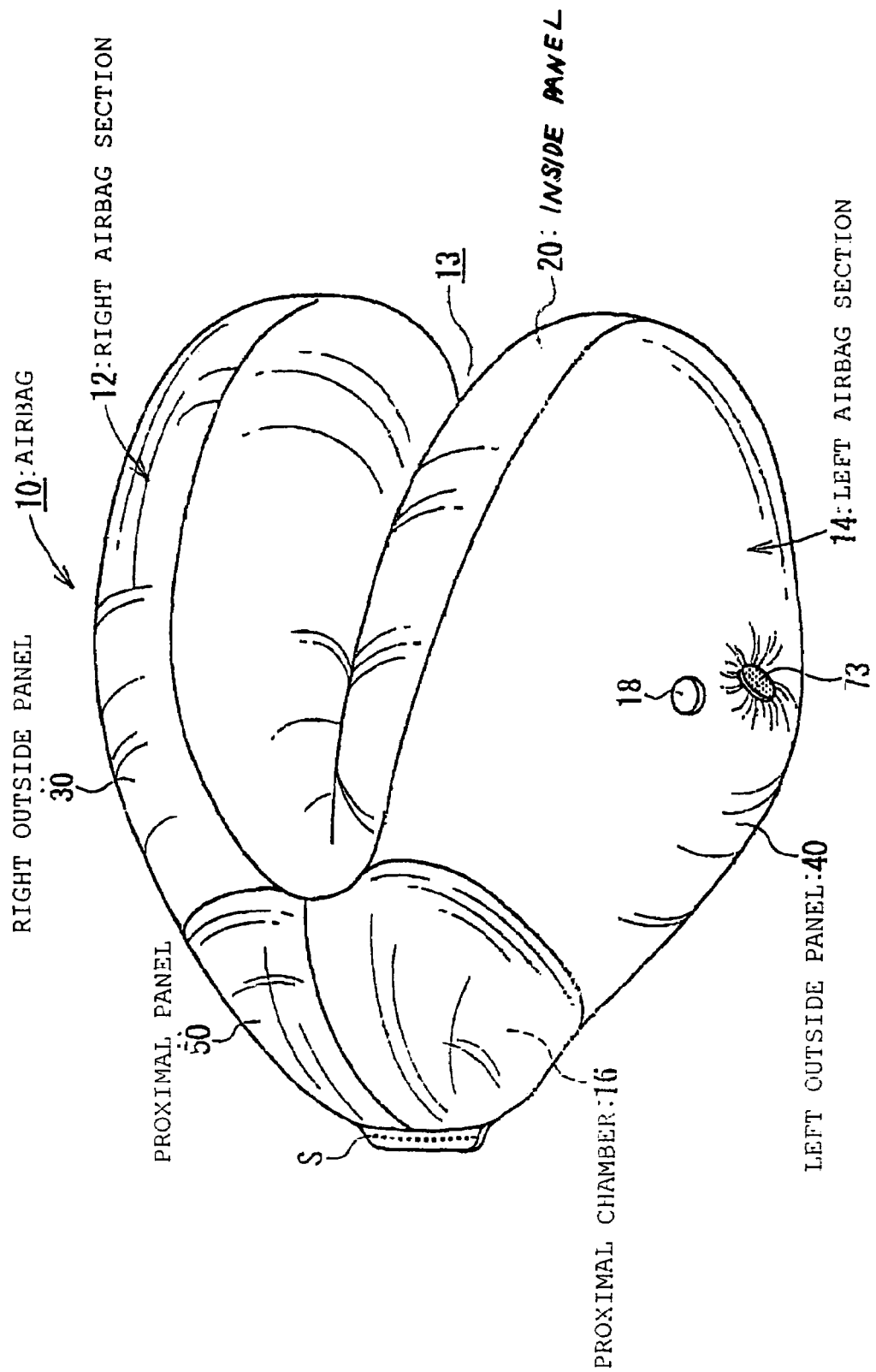
FIG. 1 is a perspective view of an airbag according to an embodiment.

Referring now to the drawings, an embodiment of the present invention will be described.

Figure 2:
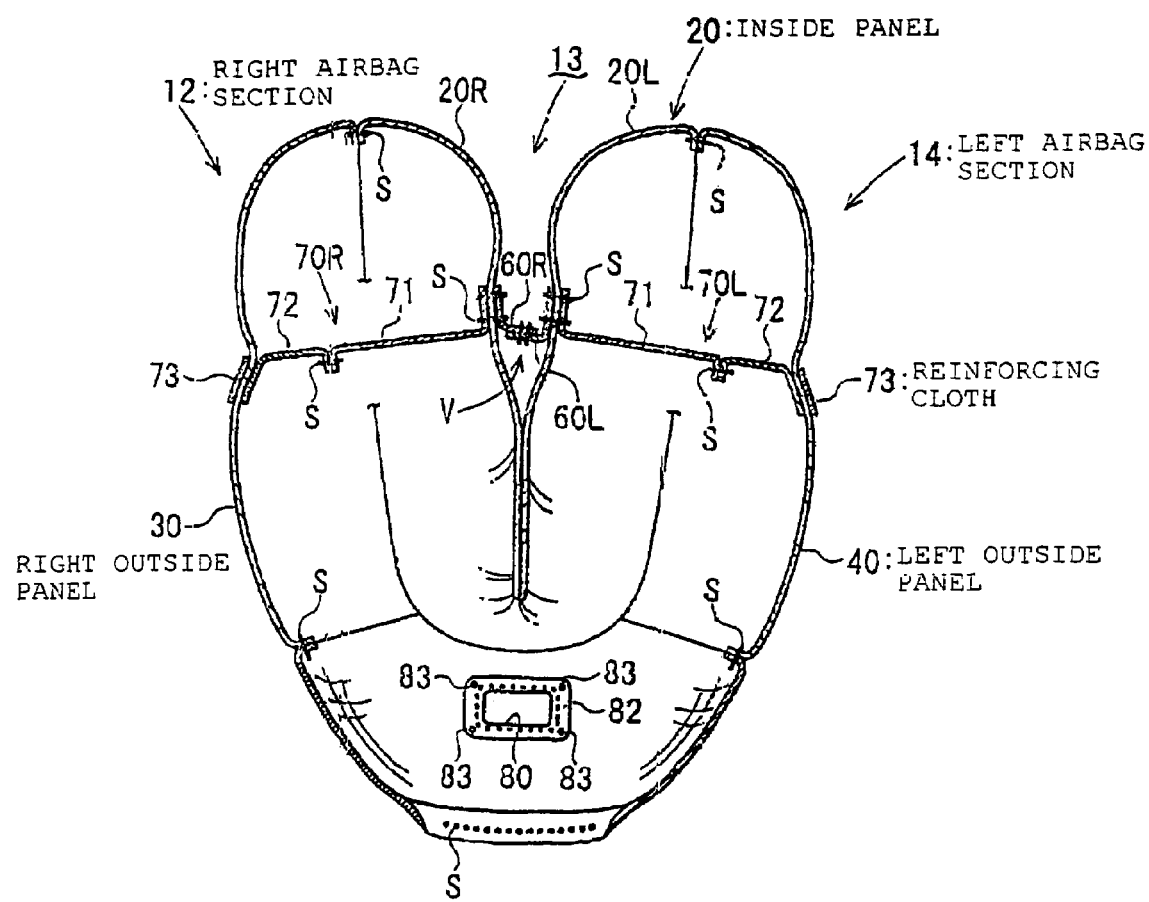
FIG. 2 is a horizontal cross-section of the airbag in FIG. 1.
Figure 3:
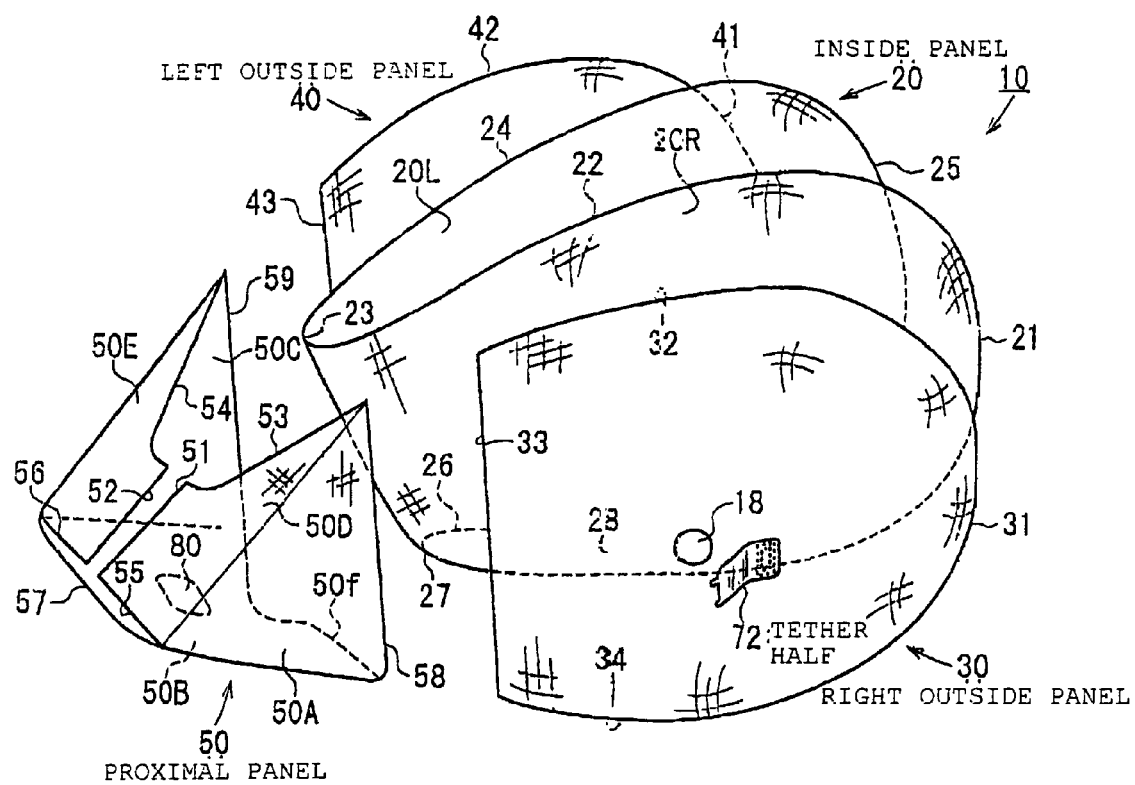
FIG. 3 is an exploded perspective view of the airbag in FIG. 1.
Figure 4:
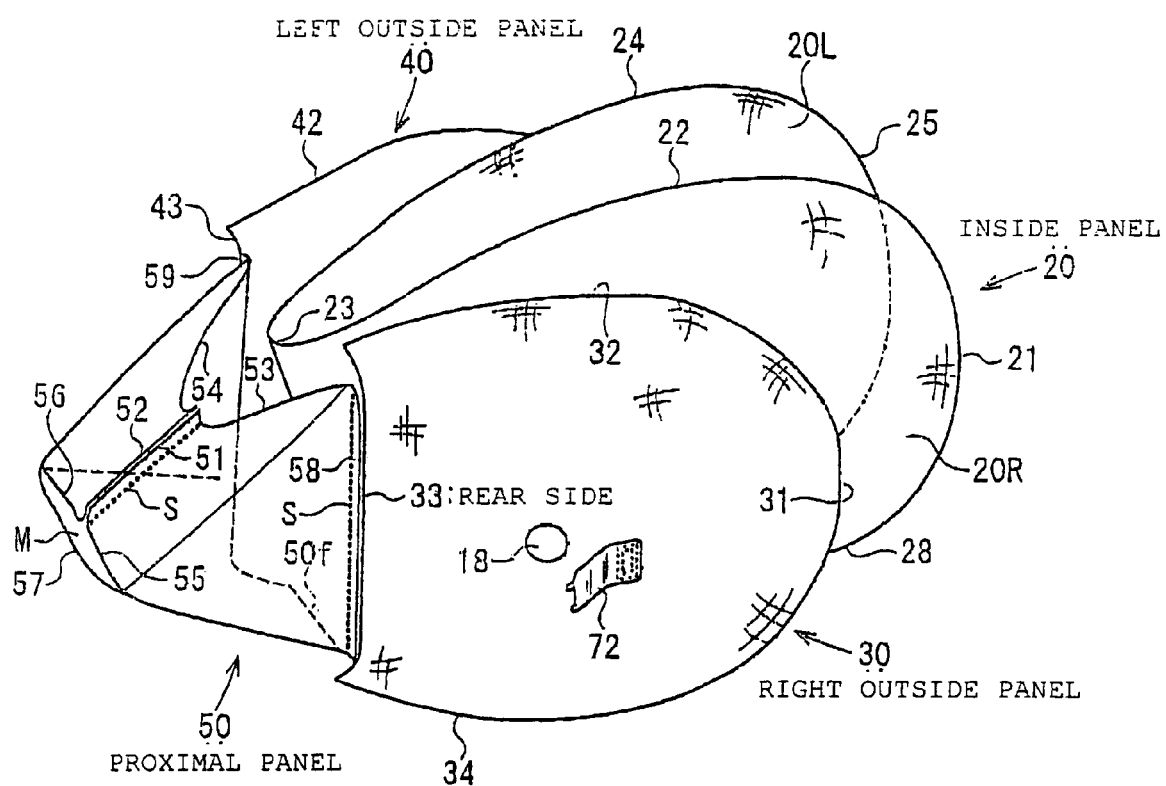
FIG. 4 is an exploded perspective view of the airbag in FIG. 1.
Figure 5:
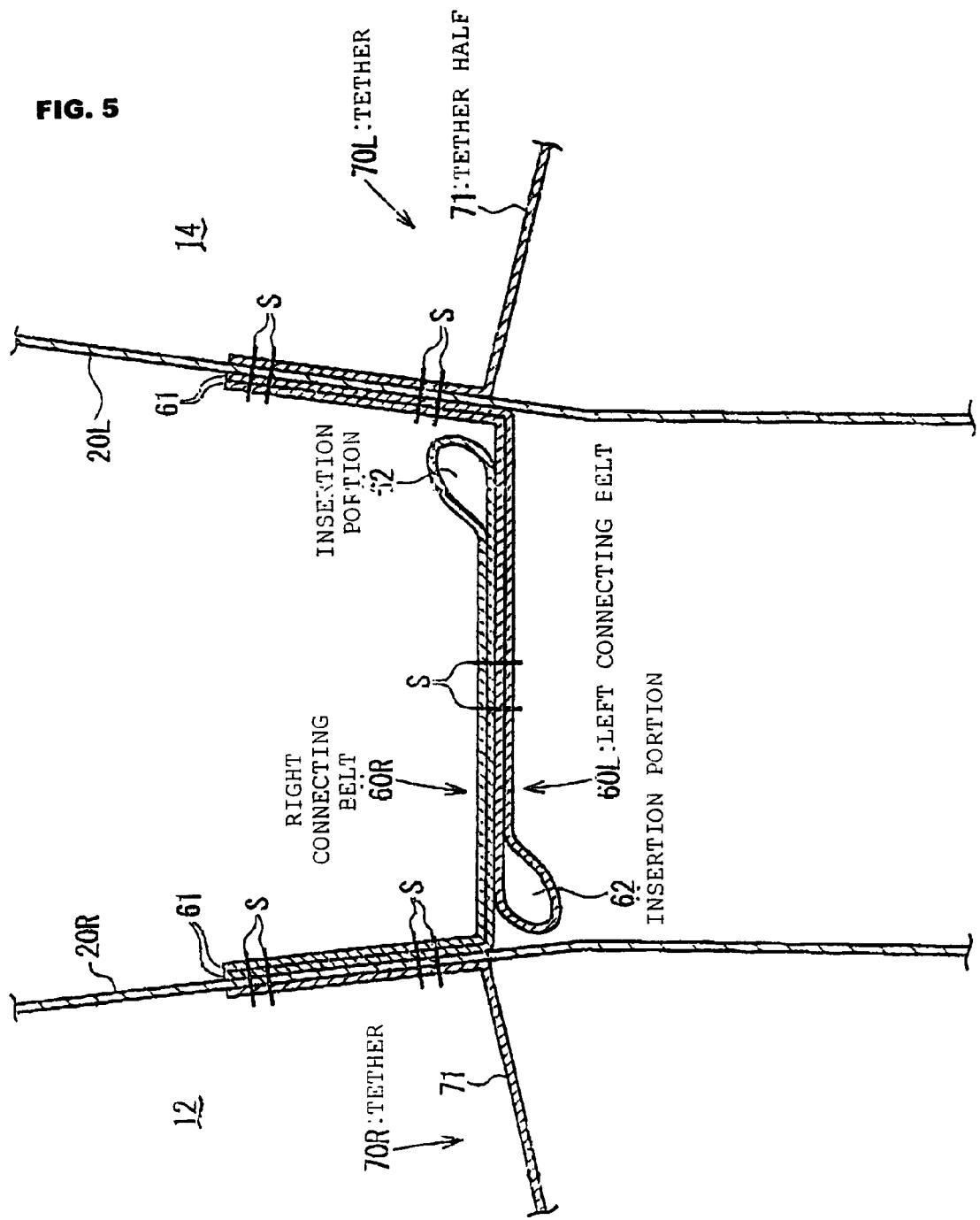
FIG. 5 is an enlarged view of a portion of a connecting belt in FIG. 2.
Figure 6:
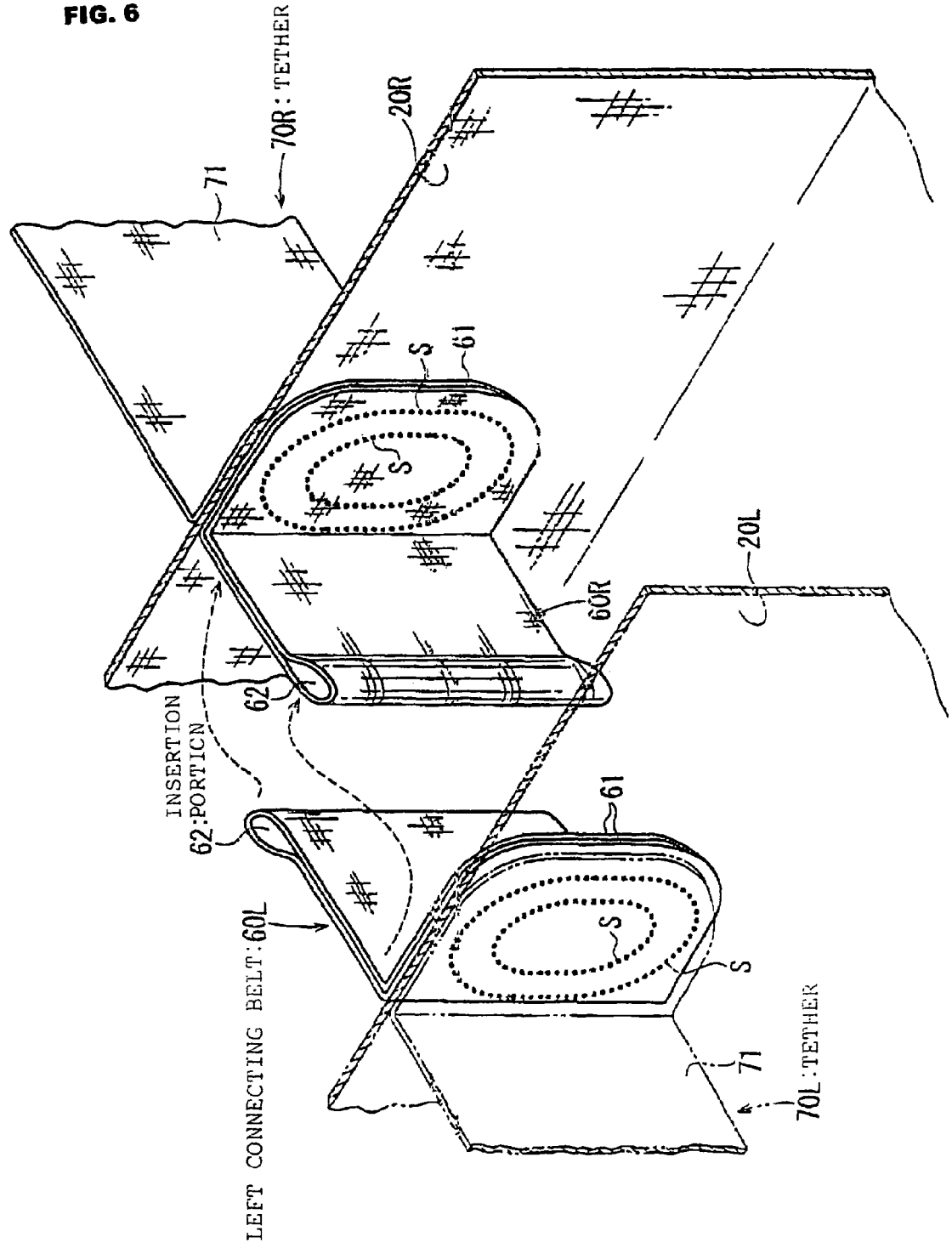
FIG. 6 is a perspective view showing an engaged relation between left and right connecting belts with respect to each other.
Figure 7:
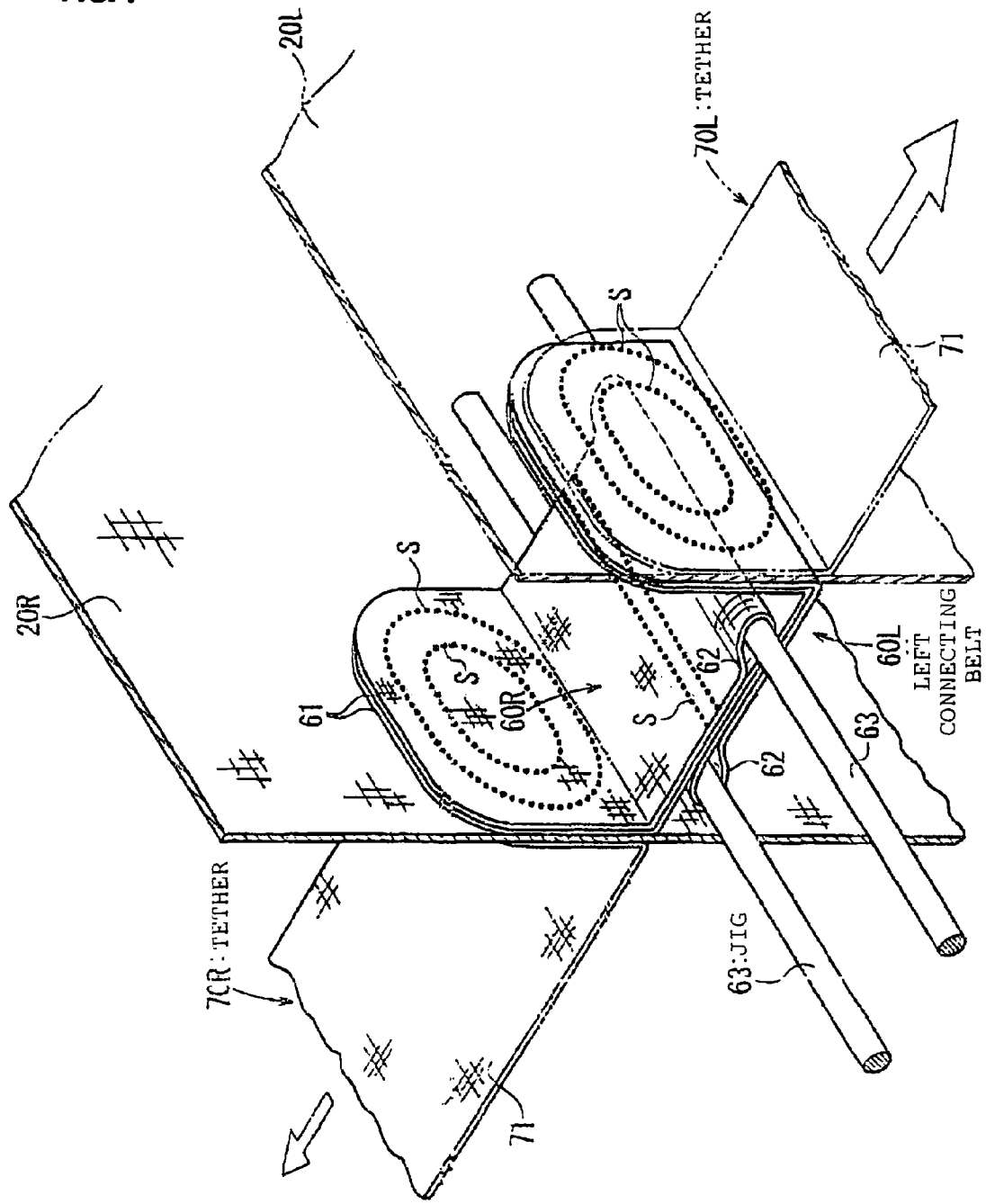
FIG. 7 is a perspective view showing a state of stitching the left and right connecting belts with respect to each other.

FIG. 1 is a perspective view of an airbag according to the embodiment of the present invention in an inflated state; FIG. 2 is a horizontal cross-section of the airbag; and FIGS. 3 and 4 are exploded perspective views of the airbag. FIG. 5 is an enlarged view of a V-portion in FIG. 2; FIG. 6 is a perspective view showing an engaged relation between left and right connecting belts; and FIG. 7 is a perspective view showing a state of stitching the left and right connecting belts with respect to each other.

An airbag 10 includes a right airbag section 12 that is inflated on the right side in front of a passenger, a left airbag section 14 that is inflated on the left side in front of the passenger, and a proximal chamber 16 which communicates proximal sides of the right airbag section 12 and the left airbag section 14.

In a state in which the airbag 10 is inflated, a member such as a tie panel which extends across distal end portions of the right airbag section 12 and the left airbag section 14 does not exist, and a space 13 defined between the distal end portions of the both bags 12, 14 is opened toward the passenger (that is, toward the right in FIG. 1 and FIG. 2).

In a state in which the inflation of the airbag 10 is completed, the distance between a distal end of the right airbag section 12 and a distal end of the left airbag section 14 is preferably 150 to 450 mm, more preferably 170 to 430 mm.

The horizontal distance between the distal ends to the inner most point of the space 13 is preferably 280 to 480 mm, and more preferably, 310 to 450 mm. The respective bags 12, 14 are connected to each other by a right connecting belt 60R and a left connecting belt 60L in a midsection between the distal ends and the inner most point.

Vent holes 18 are provided on outer surfaces of the right and left airbag sections 12, 14. The respective bags 12, 14 include width control tethers 70R, 70L extending in the lateral direction hung across therein. The structure of the tethers 70R, 70L will be described in detail.

The panel structure of the airbag 10 will be described below. In the description below, front (distal) sides of the respective panels represent distal sides of the airbag 10 in the direction of inflation, and rear sides represent proximal sides in the direction of inflation.

The airbag 10 is composed of four panels; an inside panel 20, a right outside panel 30, a left outside panel 40 and a proximal panel 50. The connecting belts 60R, 60L are connected to the inside panel 20. A method of connecting the connecting belts will be described later.

The inside panel 20 is an elongated panel of substantially a gourd shape, and forms a right side 20R and a left side 20L by being folded into two at a center thereof. The inside panel 20 constitutes an inner surface of the right airbag section 12 by the right side 20R thereof and an inner surface of the left airbag section 14 by the left side 20L thereof. Entire circumferential sides of the inside panel 20 is composed of a lower side 28, a distal side 21, an upper side 22, an upper side 23 of a folded portion which constitutes the inner most portion of the airbag valley of the right side 20R and, an upper side 24, a distal side 25, a lower side 26 and a lower side 27 near the folded portion of the left side 20L.

Entire circumferential sides of the right outside panel 30 and the left outside panel 40 is composed respectively of distal sides 31, 41, upper sides 32, 42, linear rear sides 33, 43 and lower sides 34, 44 (44 is not shown in the drawing).

The proximal panel 50 includes a right flap 50D which constitutes a right side surface 50A, a bottom surface 50B, a left side surface 50C, a right side of an upper surface and a left flap 50E which constitutes a left side of the upper surface. The proximal panel 50 is folded so that the side surfaces 50A, 50C are formed substantially into a triangular shape, and a surface facing toward the distal side of the airbag is opened.

An entire circumstantial edge of the proximal panel 50 is composed of opposed sides 51, 52 of the substantially rectangular flaps 50D, 50E, front sides (front side of the flaps) 53, 54 of the flaps 50D, 50E, rear sides 55, 56 of the flaps 50D, 50E, a rear side 57 opposing to the rear sides 55, 56, front sides (side front sides) 58, 59 of the side surfaces 50A, 50C, and a bottom front side 50ƒ which connects the side front sides 58, 59.

The respective width control tethers 70R, 70L include a pair of tether halves 71, 72 in this embodiment. As shown in FIG. 2 and FIG. 5 to FIG. 7, the tether half 71 on one side is stitched at one end thereof to the inner surface of the inside panel 20 (right side 20R or the left side 20L). The other tether half 72 is stitched at one end thereof to the inner surfaces of the outside panels 30 or 40. Reference numeral 73 designates reinforcing cloth arranged on the side opposite from the one end of the tether half 72 with the outside panels 30 or 40 being sandwiched and stitched together with the tether half 72.

In order to manufacture the airbag 10, in a state in which the proximal panel 50 is opened out flatly, the side front sides 58, 59 thereof are stitched to the rear side 33 of the right outside panel 30 and the rear side 43 of the left outside panel 40, respectively. Then, the opposed sides 51, 52 of the flaps 50D, 50E of the proximal panel 50 are stitched together. Accordingly, the panels 30, 40, and 50 are brought into a state shown in FIG. 4. Reference sign S in FIG. 4 represents a stitched seam.

Subsequently, as shown in FIG. 4, the right outside panel 30 and the right side 20R of the inside panel 20 are opposed to each other, and the distal sides 21, 31 are stitched together, the upper sides 22, 32 are stitched together, and the lower sides 28, 34 are stitched together. The left outside panel 40 and the left side 20L of the inside panel 20 are opposed to each other, and the distal sides 25, 41 are stitched together, the upper sides 24, 42 are stitched together, and the lower sides 26, 44 are stitched together. The flap front sides 53, 54 of the proximal panel 50 are stitched to the portion near the upper side 23 near the folded portion of the inside panel 20, and the bottom front side 50ƒ of the proximal panel 50 is stitched to a portion near the lower side 27 in the vicinity of the folded portion.

Subsequently, the other ends of the tether half 71 attached to the right side 20R and the tether half 72 attached to the right outside panel 30 are stitched together, and the other ends of the tether half 71 attached to the left side 20L and the tether half 72 attached to the left outside panel 40 are stitched together.

By stitching the other ends of the tether halves 71, 72 each other, the right side 20R and the right outside panel 30 are connected by the tether 70R, and the left side 20L and the left outside panel 40 are connected by the tether 70L.

By stitching as described above, a state in which the airbag 10 (FIG. 1) is turned to be inside out, that is, a state in which stitched margins are exposed on the outside of the airbag. As shown in FIG. 4, the flap rear sides 55, 56 and the rear side 57 of the proximal panel 50 are not stitched, and in this state, it defines an opening port M.

Then, the airbag is turned to be inside out through the opening port M. Then, the opening port M is stitched and the connecting belts 60R, 60L are stitched together, whereby the airbag 10 shown in FIG. 1 is obtained.

The structure of the connecting belts 60R, 60L and a method of stitching the same together will be described in detail below.

The connecting belts 60R, 60L are each obtained by folding a cloth fabric having a pair of end sides 61 at about a midsection thereof and overlapping with each other into a two-fold overlapped member. The end sides 61 are overlapped with the right side 20R and the left side 20L of the inside panel 20. One end sides of the tether halves 71 of the width control tethers 70R, 70L are overlapped with the inner sides of the bags 12, 14 which correspond to the positions where they are overlapped with the connecting belts 60R, 60L. Since the tether half 71 and the connecting belts 60R or 60L are arranged on the front and back sides of the inside panel 20, the tether half 71 serves as a reinforcing cloth for stitch between the connecting belts 60R or 60L and the inside panel 20, and the connecting belts 60R or 60L serve as a reinforcing cloth for stitch between the inside panel 20 and the tether half 71.

An insertion portion 62 is formed along the folded line between two sheets of the two-fold connecting belt 60R, and the insertion portion 62 is formed along the folded line between two sheets of the two-fold connecting belt 60L.

As shown in FIG. 7, rod-shaped jigs 63 are inserted respectively into the respective insertion portions 62. The jigs 63 are fixed in parallel at a predetermined distance in a state in which the connecting belts 60R, 60L are overlapped with each other, and the width control tethers 70L, 70R are pulled in the directions away from each other. Accordingly, the respective connecting belts 60R, 60L are applied with tensile force, and brought into a flat tensed state. Therefore, the connecting belts 60R, 60L can be stitched easily to each other.

In addition, the positional relation between the connecting belts 60R, 60L is uniquely determined since the respective jigs 63 are fixed. Therefore, the connecting belts 60R, 60L are stitched to each other so that the distance from the right side 20R to the left side 20L of the inside panel 20 is exactly the same as a designed value.

In this embodiment, as shown in FIG. 7, when the width control tethers 70R, 70L are pulled in the directions away from each other, the connecting belt 60R and the width control tether 70R are linearly aligned, and the connecting belt 60L and the width control tether 70L are linearly aligned. Therefore, a tensile force applied to the width control tethers 70R, 70L can be transmitted as is to the connecting belts 60R, 60L, and hence the tensile force can be applied sufficiently to the connecting belts 60R, 60L. After having stitched the connecting belts 60R, 60L, the jigs 63 are pulled out from the insertion portions 62.

The tethers 70R, 70L can be pulled in the directions apart from each other by holding the portions near the respective reinforcing cloths 73 of the outside panels 30, 40.

As shown in FIG. 2, an opening 80 for introducing gas is provided on the bottom surface portion 50B of the proximal panel 50. A reinforcing cloth 82 formed into a frame shape is overlapped and stitched thereon so as to surround the opening 80. The opening 80 is a square shape, and bolt insertion holes 83 are provided near the four corners thereof.

The airbag 10 is mounted to a passenger seat airbag apparatus for receiving the passenger on the passenger seat of the vehicle upon collision of the vehicle.

Although not shown in the drawings, the airbag 10 is folded and stored in a case (container), and a mounting plate is overlapped on an edge of the opening 80, and bolts implanted into the mounting plate are inserted into the bolt insertion holes 83. The airbag 10 is connected to the case by the bolts being secured to the case (container) with nuts. The airbag apparatus is configured by mounting a lid to the case so as to cover the folded body of the airbag 10. The lid is adapted to be torn by a pressing force from the airbag 10 when the airbag 10 is inflated.

The airbag apparatus is installed in an opening for the airbag apparatus provided on an upper surface of the instrument panel in front of the passenger seat of the vehicle.

In the airbag apparatus, the inflator (not shown) is activated to inject gas upon collision of the vehicle. Gas from the inflator is introduced into the proximal chamber 16 in the airbag 10 through the opening 80 to inflate the proximal chamber 16, and then is flowed into the right airbag section 12 and the left airbag section 14 to inflate the same.

In this arrangement of the airbag 10, the proximal chamber 16 inflated first comes into contact with the instrument panel and hence the posture is stabilized. Therefore, the right airbag section 12 and the left airbag section 14 are stabilized in posture not only after completion of the inflation, but also in the course of inflation.

Since the gas is supplied substantially uniformly into the left and right airbag sections 12, 14 from the inflated proximal chamber 16, both of the right airbag section 12 and the left airbag section 14 are inflated smoothly and substantially uniformly on both left and right sizes from the initial stage of inflation.

In a state in which the airbag 10 is completely inflated, the space 13 is formed in a valley shape between the distal portions of the right airbag section 12 and the left airbag section 14, and the space 13 is opened toward the passenger. Then, the inflated right airbag section 12 receives a right chest of the passenger, the inflated left airbag section 14 receives a left chest, and the portion near the breast bone opposes to the space 13. Therefore, a reaction force generated when the passenger is received by the airbag, which is applied to the portion near the breastbone is small.

In the present invention, the left airbag section and the right airbag section may be symmetrical, and may be asymmetrical. The capacity of the left airbag section and the right airbag section may be the same and may be different.

In the airbag 10, since the lateral widths of the right airbag section 12 and the left airbag section 14 in the inflated state are controlled by the width control tethers 70R, 70L, the capacity of the right airbag section 12 and the left airbag section 14 are relatively small. Therefore, even when the inflator of a small capacity is employed, the right airbag section 12 and the left airbag section 14 are inflated in a sufficiently early stage.

In inflating the right airbag section 12 and the left airbag section 14 of the airbag 10, even if one of the airbags 12 or 14 is inflated ahead and then inflation of the other airbags 14 or 12 is delayed, the right airbag section 12 and the left airbag section 14 are connected via the connecting belts 60L, 60R, and therefore the one airbag which is inflated ahead pulls the other airbag which is delayed in inflation to promote inflation thereof. In addition, since the right airbag section 12 and the left airbag section 14 are connected to each other at midsections in the inflation direction, the one airbag which has started inflation ahead starts to pull the other airbag which is delayed in inflation in the direction of inflation after having started inflation thereof in a relatively early stage. Accordingly, both of the right airbag section 12 and the left airbag section 14 are inflated smoothly and substantially uniformly on the left and right sizes from an initial stage of inflation.

The airbag 10 may be configured in such a manner that the inner most portion of the valley (space 13) between the right airbag section 12 and the left airbag section 14 may be connected by the tether to the intermediate portion between the upper side 23 and the lower side 27 in FIG. 3 and the portion near the opening port M of the proximal panel 50. In this arrangement, the valley between the inflated right airbag section 12 and left airbag section 14 can be formed to be deep.

In the embodiment described above, although the connecting belts 60R, 60L formed with the insertion portions 62 by folding cloths are employed, it is also possible to employ the connecting belts formed with the insertion portions by stitching.

What is claimed is:

1. An airbag comprising:
   opposing airbag portions each having an internal chamber for being inflated with an external gap therebetween;
   a pair of external connecting members for interconnecting the opposing airbag portions externally from the internal chambers of the airbag portions with one of the connecting members being connected to one of the airbag portions and the other connecting member being connected to the other airbag portion;
   holding portions of the connecting members having predetermined configurations so that the connecting members are adapted to be held at the holding portions thereof as the connecting members are connected together; and
   interconnected portions of the connecting members at which the connecting members are connected together and which are distinct from the respective holding portions thereof with the interconnected portions and holding portions being arranged so that with the connected members held and pulled tight via the holding portions thereof as the connecting members are connected together at the interconnected portions thereof, the holding portion of the one connecting member is closer to the other airbag portion than to the one airbag portion and the holding portion of the other connecting member is closer to the one airbag portion than to the other airbag portion with the interconnected portions being between the holding portions outside the internal chambers of the airbag portions.

2. The airbag of claim 1 wherein the predetermined configurations of the holding portions are loop configurations thereof.

3. The airbag of claim 1 wherein the predetermined configurations of the holding portions are enlarged ends of the connecting members in which openings are formed for receipt of respective holding members therein.

4. The airbag of claim 1 wherein the connecting members are connecting belts with the holding portions being loop end portions of the connecting belts.

5. The airbag of claim 1 wherein the opposing airbag portions have internal control members connected thereto to be generally aligned with one of the connecting members adjacent thereto.

6. The airbag of claim 5 wherein the connecting members each have overlapping portions at a connection location where the connecting members are connected to the airbag portions with the control members connected to the airbag portions at the connecting locations so that the overlapping portions and control members have material of the airbag portions therebetween at the connecting locations.

7. The airbag of claim 1 wherein the connecting members comprise connecting belts, and the airbag portions have tethers extending across the internal chambers and attached to the airbag portions at ends of the tethers, the connecting belts each being connected to the associated airbag portion adjacent one of the tether ends therein so that holding the connecting members at the holding portions thereof and pulling the airbag portions at the tether end opposite to the adjacent tether end tensions the connecting belts for ease of stitching overlapping portions of the connecting belts together.

8. The airbag of claim 1 in combination with an inflator for inflating the airbag portions.

9. The airbag of claim 1 wherein the connecting members comprise belts that are folded so that the holding portions thereof have a loop configuration and the interconnected portions each have two layers of belt material with there being four layers of belt material where the connecting members are connected together.

* * * * *